(12) United States Patent
Nakagawa et al.

(10) Patent No.: US 10,508,608 B2
(45) Date of Patent: Dec. 17, 2019

(54) CONTROL DEVICE FOR ENGINE

(71) Applicant: Hitachi Automotive Systems, Ltd., Hitachinaka-shi, Ibaraki (JP)

(72) Inventors: Shinji Nakagawa, Tokyo (JP); Toshio Hori, Hitachinaka (JP); Akihito Numata, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/313,995

(22) PCT Filed: May 7, 2015

(86) PCT No.: PCT/JP2015/063161
§ 371 (c)(1),
(2) Date: Nov. 25, 2016

(87) PCT Pub. No.: WO2015/182338
PCT Pub. Date: Dec. 3, 2015

(65) Prior Publication Data
US 2017/0211497 A1    Jul. 27, 2017

(30) Foreign Application Priority Data
May 28, 2014    (JP) .................................. 2014-109659

(51) Int. Cl.
*F02D 41/14* (2006.01)
(52) U.S. Cl.
CPC ..... *F02D 41/1495* (2013.01); *F02D 41/1454* (2013.01); *F02D 41/1475* (2013.01); *F02D 41/1477* (2013.01)
(58) Field of Classification Search
CPC ............. F02D 41/1454; F02D 41/1495; F02D 41/1475; F02D 41/1477; F02D 41/1408;
(Continued)

(56) References Cited

U.S. PATENT DOCUMENTS

| 4,472,262 A | * | 9/1984 | Kondo | ............... | G01N 27/4065 |
| | | | | | 204/408 |
| 5,077,970 A | * | 1/1992 | Hamburg | ............... | F01N 11/007 |
| | | | | | 60/274 |

(Continued)

FOREIGN PATENT DOCUMENTS

| JP | 2008-175202 A | 7/2008 |
| JP | 2010-190089 A | 9/2010 |

(Continued)

OTHER PUBLICATIONS

International Search Report (PCT/ISA/210) issued in PCT Application No. PCT/JP2015/063161 dated Jul. 28, 2015 with English-language translation (two (2) pages).

(Continued)

*Primary Examiner* — George C Jin
(74) *Attorney, Agent, or Firm* — Crowell & Moring LLP

(57) ABSTRACT

The purpose of the present invention is to detect deterioration of dead time characteristics of an air-fuel ratio sensor with high accuracy without causing running performance and exhaust performance to worsen. The present invention provides a control device for an engine, characterized by being equipped with: a means for detecting an air-fuel ratio; a means for changing the air-fuel ratio in a predetermined cycle; and a means for sending a notification of an abnormality in the air-fuel ratio detection means or causing at least a portion of the engine control to run in a fail-safe mode when the amplitude of an output signal of the air-fuel ratio detection means at a predetermined frequency is within a predetermined range and the required time or required angle to arrive at a predetermined value of the output signal of the air-fuel ratio detection means from a reference position or reference time point of an engine-related parameter is equal to a predetermined value or higher.

5 Claims, 17 Drawing Sheets

(58) Field of Classification Search
CPC ............. F02D 41/1474; F02D 41/1496; F02D 41/1455; F02D 41/1476; F02D 41/148; F02D 41/222; F02D 41/30; F02D 2041/227; F02D 2041/228; G01M 15/104
USPC ................................................ 73/23.32, 1.06
See application file for complete search history.

(56) References Cited

U.S. PATENT DOCUMENTS

| | | | | |
|---|---|---|---|---|
| 5,423,203 | A | * | 6/1995 | Namiki ............... F02D 41/1495 123/688 |
| 5,964,208 | A | * | 10/1999 | Yamashita .......... F02D 41/1456 123/674 |
| 2007/0186914 | A1 | | 8/2007 | Nakagawa et al. |
| 2008/0154528 | A1 | * | 6/2008 | Iwazaki ............... G01M 15/104 702/100 |
| 2010/0211290 | A1 | * | 8/2010 | Kidokoro ........... F02D 41/1408 701/103 |
| 2013/0180509 | A1 | | 7/2013 | Makki et al. |
| 2013/0297192 | A1 | | 11/2013 | Imeroski |
| 2014/0121950 | A1 | * | 5/2014 | Jessen ................. F02D 41/0085 701/104 |

FOREIGN PATENT DOCUMENTS

| | | |
|---|---|---|
| JP | 2011-157938 A | 8/2011 |
| JP | 2012-127356 A | 7/2012 |

OTHER PUBLICATIONS

Japanese-language Written Opinion (PCT/ISA/237) issued in PCT Application No. PCT/JP2015/063161 dated Jul. 28, 2015 (five (5) pages).

Extended European Search Report issued in counterpart European Patent Application No. 15799458.3 dated Jan. 11, 2018 (Eight (8) pages).

* cited by examiner

PROCESSING CYCLE: 4ms OR 10ms

<FUEL INJECTION QUANTITY CORRECTION VALUE CALCULATION UNIT>

PROCESSING CYCLE: 4ms OR 10ms

<AMPLITUDE CALCULATION UNIT>

PROCESSING CYCLE: 4ms OR 10ms

<REQUIRED TIME (REQUIRED ANGLE) CALCULATION UNIT>

PROCESSING CYCLE: 10ms

<DEAD TIME ABNORMALITY DETERMINATION UNIT>

PROCESSING CYCLE:
4ms OR 10ms

<AMPLITUDE CALCULATION UNIT>

FIG. 11  <REQUIRED ANGLE CALCULATION UNIT>

PROCESSING CYCLE: 4ms OR 10ms

PROCESSING CYCLE: 10ms

<DEAD TIME ABNORMALITY DETERMINATION UNIT>

PROCESSING CYCLE:
EVERY COMBUSTION
(EVERY 180degCA)

<AMPLITUDE CALCULATION UNIT>

PROCESSING CYCLE:
EVERY COMBUSTION
(EVERY 180degCA)

<REQUIRED ANGLE CALCULATION UNIT>

PROCESSING CYCLE: 10ms

<DEAD TIME ABNORMALITY DETERMINATION UNIT>

<AIR-FUEL RATIO FEEDBACK CORRECTION VALUE CALCULATION UNIT>

CONTROL DEVICE FOR ENGINE

TECHNICAL FIELD

The present invention relates to a control device for an engine, and particularly to detect deterioration of an air-fuel ratio sensor which detects an air-fuel ratio of an exhaust pipe.

BACKGROUND ART

As a background art to which this application belongs, there is a technique disclosed in JP 2008-175202 A (PTL 1). The publication discloses a technique in which a dead time of the air-fuel ratio sensor is measured from a peak variance value of an input air-fuel ratio and a peak value of an output air-fuel ratio of the air-fuel ratio sensor which detects the air-fuel ratio of an exhaust gas of an internal combustion engine, and diagnoses an abnormality.

CITATION LIST

Patent Literature

PTL 1: JP 2008-175202 A

SUMMARY OF INVENTION

Technical Problem

In the technique disclosed in PTL 1, there is a need to change the air-fuel ratio in a stepped manner between a lean side and a rich side about a predetermined center of the air-fuel ratio during a cycle when the variance value is calculated. Therefore, there is a need to keep control to change the air-fuel ratio during the cycle when the variance value is calculated, and thus running performance and exhaust performance of the engine are deteriorated. In addition, there is a problem in that a detection cycle is also increased to calculate the variance value.

The invention has been made in view of such problems, and an object thereof is to detect deterioration of dead time characteristics of the air-fuel ratio sensor with high accuracy without causing running performance and exhaust performance to worsen.

Solution to Problem

In order to solve the above issue, a control device according to the present invention includes: an air-fuel ratio detection unit that detects an air-fuel ratio of an exhaust pipe; and an air-fuel ratio change unit that changes an air-fuel ratio of the exhaust pipe in a predetermined cycle, wherein a notification of an abnormality in the air-fuel ratio detection unit is notified or at least a portion of engine control is caused to run in a fail-safe mode when an amplitude of an output signal of the air-fuel ratio detection unit at a predetermined frequency while the air-fuel ratio is changed by the air-fuel ratio change unit is equal to or more than a predetermined value and a required time or a required angle to arrive at a predetermined value of an output signal of the air-fuel ratio detection unit from a reference position or a reference time point of a parameter related to a phase of the engine is equal to or more than a predetermined value.

Advantageous Effects of Invention

According to the invention, it is possible to diagnose deterioration in a short cycle since the deterioration of an air-fuel ratio sensor is diagnosed on the basis of an amplitude and a phase change of an output signal of the air-fuel ratio sensor.

In addition, it is possible to detect deterioration of dead time characteristics of the air-fuel ratio sensor in a short time and with high accuracy using relatively-high-frequency oscillation of the air-fuel ratio without causing running performance and exhaust performance to worsen in a state where an average air-fuel ratio is optimized for the air-fuel ratio of the exhaust.

DESCRIPTION OF EMBODIMENTS

Hereinafter, embodiments will be described using the drawings.

First Embodiment

Figure 1:
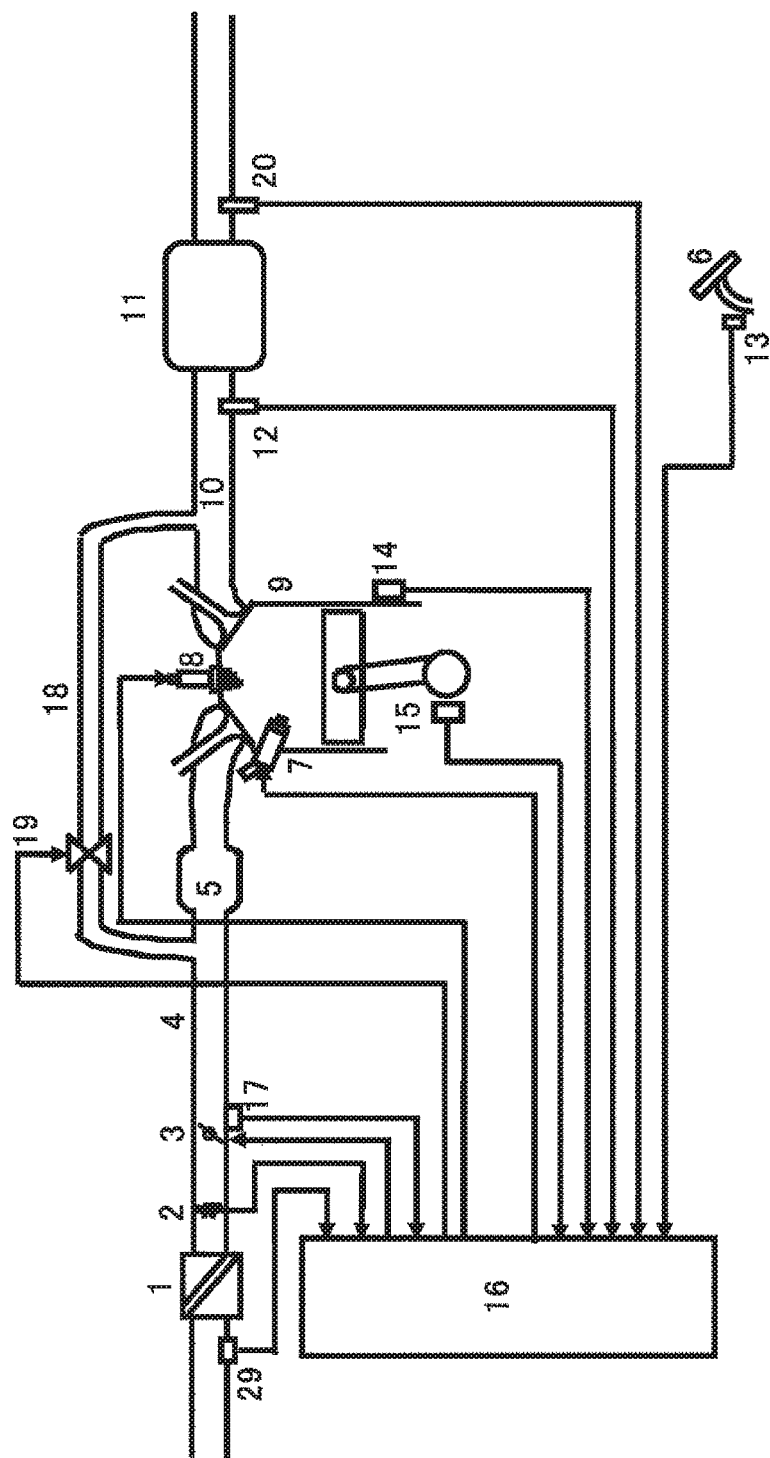
FIG. 1 is a diagram illustrating an engine control system in first to fourth embodiments.

FIG. 1 is a diagram illustrating a system of this embodiment. In a multi-cylinder (herein, 4-cylinder) engine 9, the air from the outside passes through an air cleaner 1, and flows into the cylinder through an intake manifold 4 and a collector 5. An inflow air amount is adjusted by an electronic throttle 3. The inflow air amount is detected by an air flow sensor 2. In addition, an intake air temperature is detected by an intake air temperature sensor 29. A crank angle sensor 15 outputs a signal every a rotation angle of 10° of a crank shaft, and a signal every combustion cycle. A water temperature sensor 14 detects a temperature of cooling water of the engine 9. In addition, an accelerator opening sensor 13 detects a stepping amount of an accelerator 6, and detects a driver's requiring torque.

The respective signals of the accelerator opening sensor 13, the air flow sensor 2, the intake air temperature sensor 29, a throttle opening sensor 17 attached to the electronic throttle 3, the crank angle sensor 15, and the water temperature sensor 14 are sent to a control unit 16 described below. An operation state of the engine 9 is obtained from these sensor outputs. An air amount, a fuel injection quantity, and a primary operation amount of the engine 9 at an ignition time point are optimally calculated.

A target air amount calculated in the control unit 16 is converted from a target throttle opening to an electronic throttle drive signal, and transmitted to the electronic throttle 3. The fuel injection quantity is converted into a valve opening pulse signal, and sent to a fuel injection valve (injector) 7. In addition, the drive signal is sent to an ignition plug 8 for the ignition at the ignition time point calculated by the control unit 16.

The injected fuel is mixed with the air from the intake manifold and flows into the cylinder of the engine 9 to form a mixture. The mixture is exploded by a spark generated from the ignition plug 8 at a predetermined ignition time point, and a piston is pulled down by the combustion pressure to serve as power of the engine 9. The exhaust gas after the explosion is sent in a three-way catalyst 11 through an exhaust manifold 10. Part of the exhaust gas is recirculated toward an intake side through an exhaust recirculating pipe 18. A recirculating amount is controlled by an EGR valve 19.

An air-fuel ratio sensor 12 is attached to an exhaust pipe collecting part. A catalyst downstream O2 sensor 20 is attached on the downstream of the three-way catalyst 11.

Figure 2:
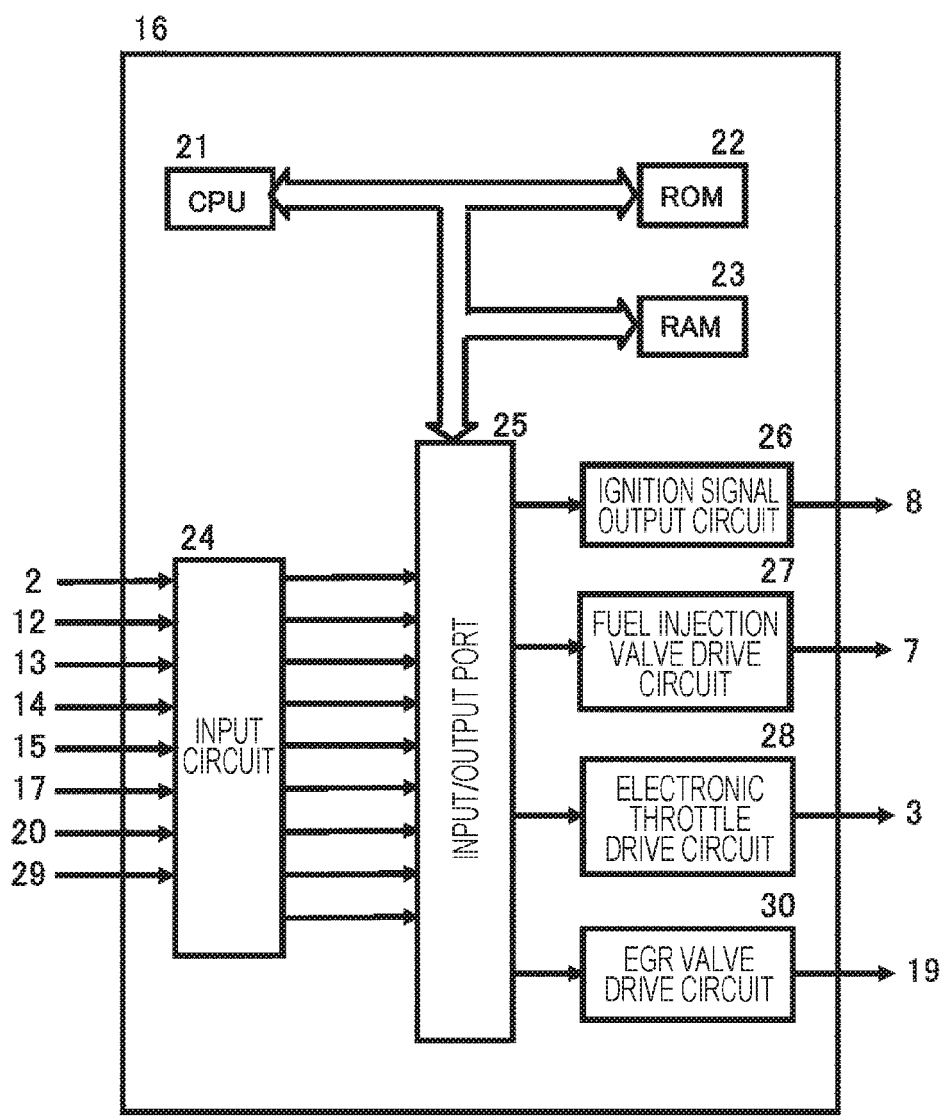
FIG. 2 is a diagram illustrating an inner configuration of a control unit in the first to fourth embodiments.

FIG. 2 illustrates the inner configuration of the control unit 16. The respective sensor output values of the air flow sensor 2, the air-fuel ratio sensor 12, the accelerator opening sensor 13, the water temperature sensor 14, the crank angle sensor 15, a throttle valve opening sensor 17, the catalyst downstream O2 sensor 20, and the intake air temperature sensor 29 are input to an ECU 16. After signal processing such as noise removal is performed in an input circuit 24, the signals are sent to an input/output port 25. The value of the input port is stored in a RAM 23, and subjected to a calculation process in a CPU 21. A control program describing the content of the calculation process is written in a ROM 22 in advance. The values indicating respective actuator operation amounts calculated according to the control program are stored in the RAM 23 and then sent to the input/output port 25. The operation signal of the ignition plug 8 is an ON/OFF signal which is turned on when a primary coil in the ignition output circuit 26 is energizing, and turned off when not being energizing. The ignition time point is a timing when the signal is turned from ON to OFF. A signal for the ignition plug 8 set to the output port is amplified to have energy sufficient for the combustion by the ignition output circuit 26, and supplied to the ignition plug 8. In addition, the drive signal of the fuel injection valve 7 is an ON/OFF signal which is turned on when the valve is opened, and turned off when the valve is closed. The drive signal is amplified to have energy sufficient for opening the fuel injection valve 7 by a fuel injection valve drive circuit 27, and sent to the fuel injection valve 7. The drive signal for realizing a target opening of the electronic throttle 3 is sent to the electronic throttle 3 through an electronic throttle drive circuit 28. The drive signal for realizing the target opening of the EGR valve 19 is sent to the EGR valve 19 through an EGR valve drive circuit 30.

Figure 3:
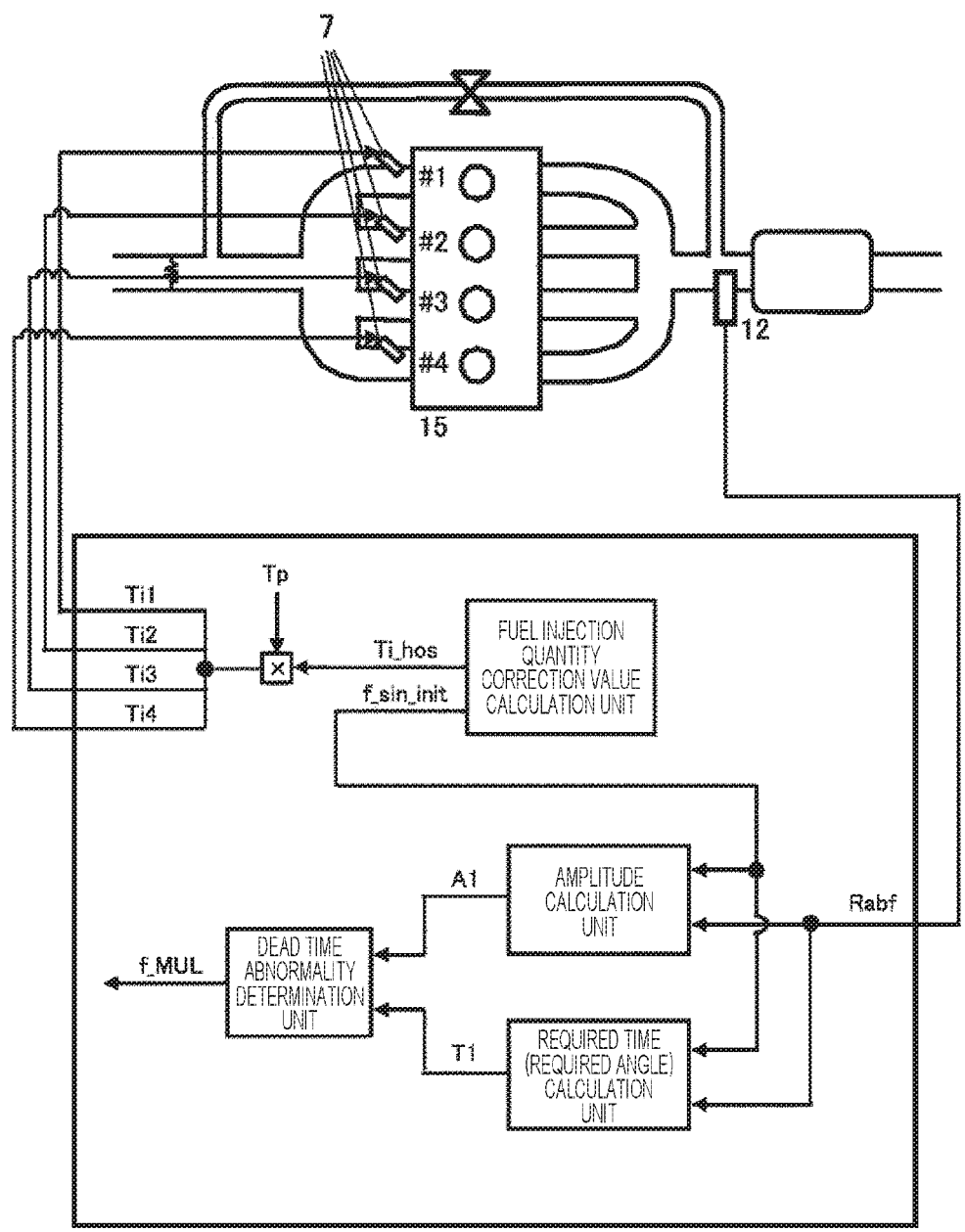
FIG. 3 is a block diagram illustrating the entire control in the first embodiment.

Hereinafter, the description will be made about the control program written in the ROM 22. FIG. 3 is a block diagram illustrating the entire control, and is configured by the following calculation units.

Figure 6:
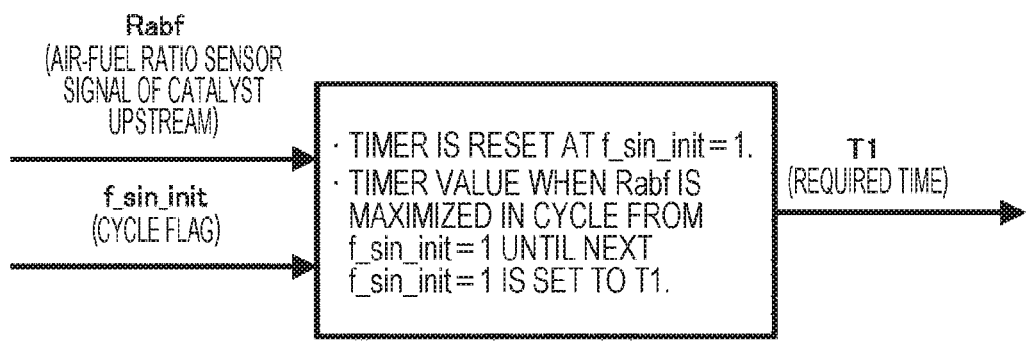
FIG. 6 is a block diagram illustrating a required time (required angle) calculation unit in the first embodiment.
Figure 7:
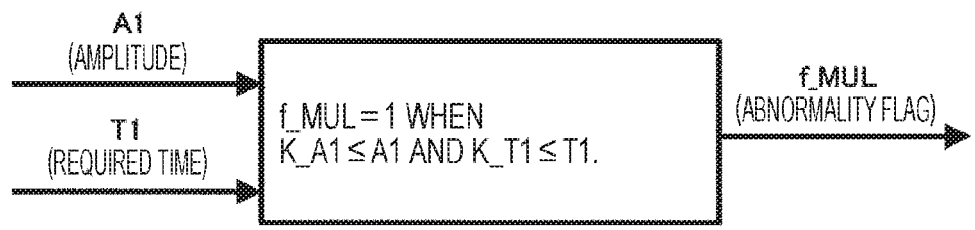
FIG. 7 is a block diagram illustrating a dead time abnormality determination unit in the first embodiment.

Fuel injection quantity correction value calculation unit (FIG. 4)
Amplitude calculation unit (FIG. 5)
Required time (required angle) calculation unit (FIG. 6)
Dead time abnormality determination unit (FIG. 7)

The "fuel injection quantity correction value calculation unit" calculates a fuel injection quantity correction value (Ti_hos) to uniformly change the fuel injection quantities of all the cylinders and a cycle flag (f_sin_init) which is turned on at every predetermined cycle. Injection pulse widths (Ti1 to Ti4) for determining the fuel injection quantities of the respective cylinders are calculated by multiplying Ti_hos by a base fuel injection quantity (Tp). Further, Tp is obtained from an intake air amount, an engine rotation rate, and an injection amount performance of the injector. While the method of calculating Tp is a well-known method, and thus the description thereof will not made in detail. The "amplitude calculation unit" obtains an amplitude (A1) of an air-fuel ratio signal from an air-fuel ratio sensor signal (Rabf) of the catalyst upstream. The "required time (required angle) calculation unit" obtains an angle or a required time (Ti) from when f_sin_init becomes "1" until a time when Rabf is maximized during one cycle of the predetermined cycle, and from the air-fuel ratio sensor signal (Rabf) of the catalyst upstream. The "dead time abnormality determination unit" obtains an abnormality flag (f_MUL) from A1 and T1. Hereinafter, the description will be made about the details of the respective calculation units.

<Fuel Injection Quantity Correction Value Calculation Unit (FIG. 4)>

Figure 4:
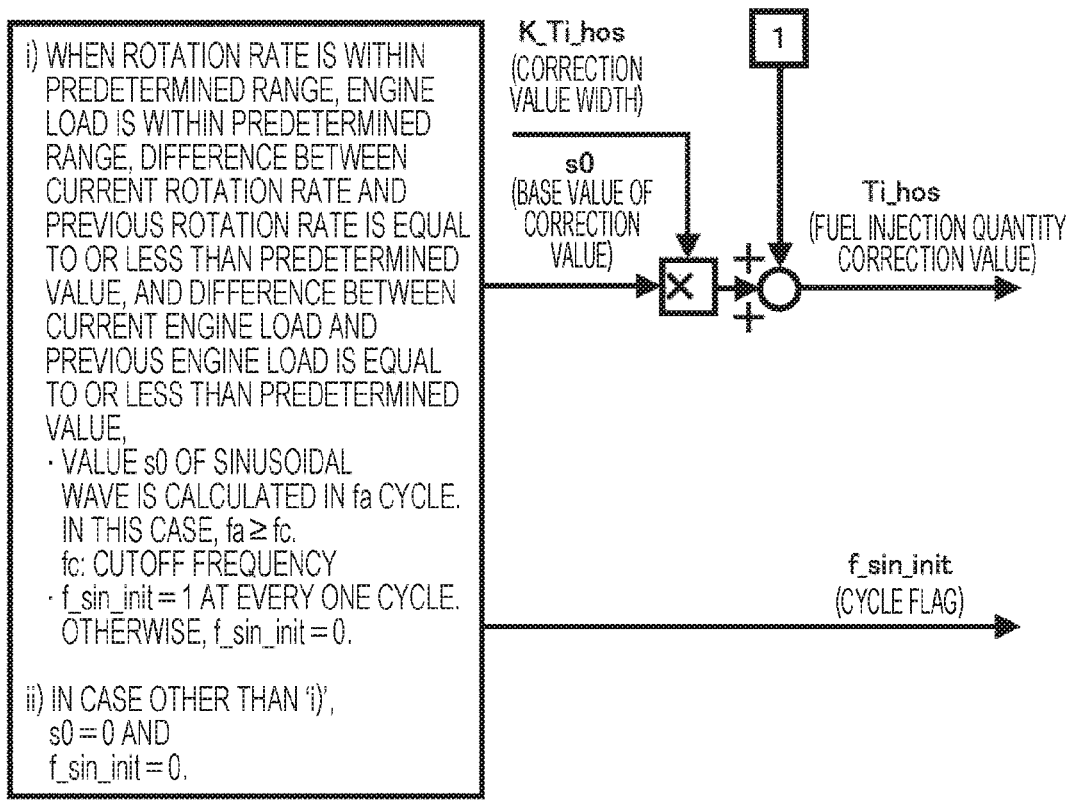
FIG. 4 is a block diagram illustrating a fuel injection quantity correction value calculation unit in the first embodiment.

In this calculation unit, Ti_hos (fuel injection quantity correction value) and f_sin_init (cycle flag) are calculated. Specifically, the calculation is illustrated in FIG. 4.

i) When the rotation rate is within a predetermined range, the engine load is within a predetermined range, a difference between the current rotation rate and the previous rotation rate is equal to or less than a predetermined value, and a difference between the current engine load and the previous engine load is equal to or less than a predetermined value.

A value s0 of a sinusoidal wave is calculated in a cycle of fa

In this case, fa≥fc.
fc: cutoff frequency
f_sin_init=1 at every one cycle.
Otherwise, f_sin_init=0.

ii) In a case other than 'i)', s0=0 and f_sin_init=0.

Ti_hos (fuel injection quantity correction value) is set by a value obtained by multiplying K_Ti_hos (correction value width) by s0 and increasing by "1". K_Ti_hos is a value to determine the fuel injection quantity or a vibrational amplitude of an actual air-fuel ratio, and is determined in consideration of running performance of the engine 9, exhaust performance, and a detection accuracy of dead time characteristics. Further, an influence onto the engine performance is taken into consideration. It is desirable that the number of counts for oscillating Ti_hos in the cycle of fa be determined to a predetermined number of counts and oscillated by a required minimum number of counts.

<Amplitude Calculation Unit (FIG. 5)>

Figure 5:
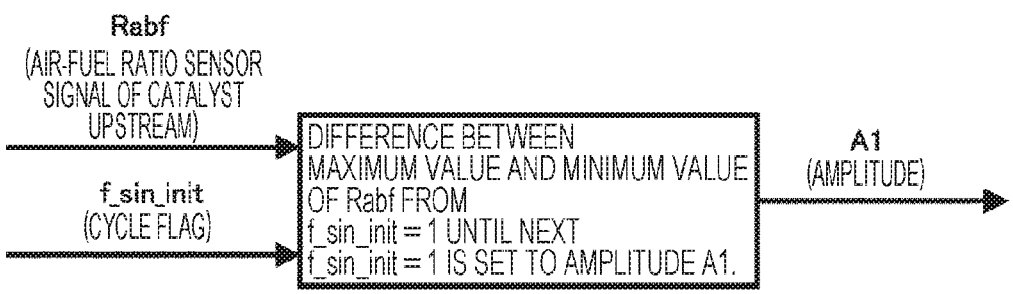
FIG. 5 is a block diagram illustrating an amplitude calculation unit in the first embodiment.

In this calculation unit, A1 (amplitude) is calculated. Specifically, the calculation is illustrated in FIG. 5. A difference between a maximum value and a minimum value of Rabf from when f_sin_init=1 is satisfied until a time when the next f_sin_init=1 is satisfied becomes the amplitude A1.

<Required Time (Required Angle) Calculation Unit (FIG. 6)>

In this calculation unit, T1 (required time) is calculated. Specifically, the calculation is illustrated in FIG. 6.

A timer is reset when f_sin_init=1 is satisfied.

A timer value when Rabf is maximized in a cycle from when f_sin_init=1 is satisfied until a time when the next f_sin_init=1 is satisfied is set to T1. Further, the above process is performed about the required time, but a required angle may be calculated as described below.

The rotation angle θa of the engine when f_sin_init=1 is satisfied is stored.

The rotation angle of the engine when Rabf is maximized in a cycle from when f_sin_init=1 is satisfied until a time when the next f_sin_init=1 is satisfied is set to θb, and θb−θa is set to a required angle θ0. Further, a dynamic range of θ0 is set according to a length of the dead time of the air-fuel ratio sensor 12, and an operation condition and the cycle fa of the engine at the time of detection (the dynamic range may become larger than 360 deg).

<Dead Time Abnormality Determination Unit (FIG. 7)>

In this calculation unit, f_MUL (abnormality flag) is calculated. Specifically, the calculation is illustrated in FIG. 7.

When K_A1≤A1 and K_T1≤T1, f_MUL is set to 1.

K_A1 and K_T1 are values to define a level for determining the dead time abnormality. These values are determined according to a diagnosis target performance.

Further, in a case where the determination is performed using the required angle θ0 described above, the calculation is performed as the following process.

When K_A1≤A1 and K_θ0≤θ0, f_MUL is set to 1.

K_θ0 is a value to define a level for determining the dead time abnormality. This value is determined according to the diagnosis target performance. In addition, even when the dead time of the air-fuel ratio sensor 12 is constant, a required angle θ0 is changed according to the rotation rate of the engine 9. Therefore, in a case where the detection is performed at various rotation rates, the correction is performed to make sensitivity of the rotation rate disappear.

Second Embodiment

In this embodiment, the air-fuel ratio of one cylinder is set to be shifted by a predetermined amount from the air-fuel ratios of the others to generate oscillation in the air fuel oscillation in two rotation cycle of the engine. The dead time deterioration of the air-fuel ratio sensor 12 is detected using the subject signal.

FIG. 1 is a diagram illustrating the system of this embodiment, and the same portions as those of the first embodiment will not be described in detail. FIG. 2 illustrates the inner configuration of the control unit 16, and the same portions as those of the first embodiment will not be described in detail.

Figure 8:
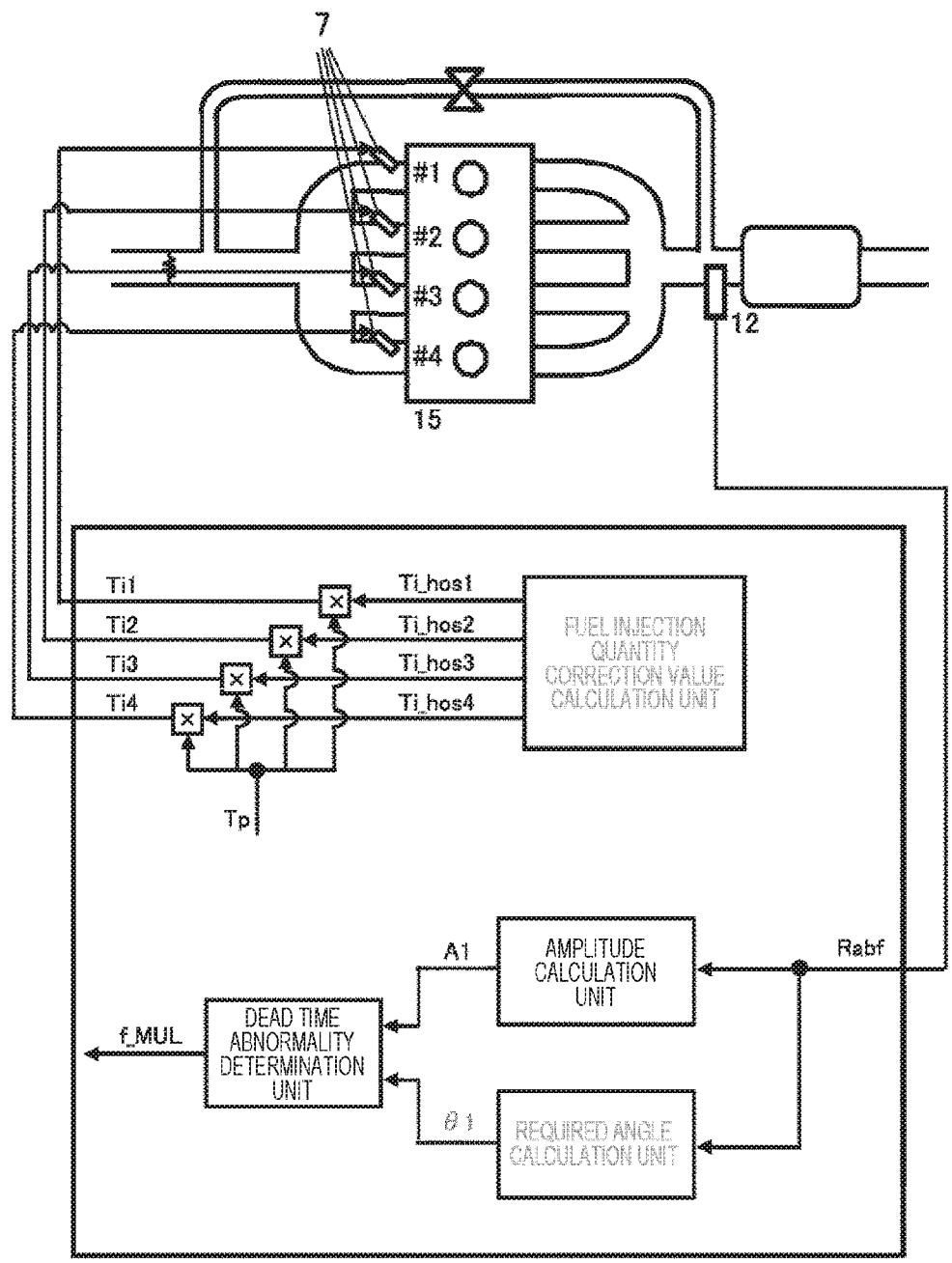
FIG. 8 is a block diagram illustrating the entire control in a second embodiment.

Hereinafter, the description will be made about the control program written in the ROM 22. FIG. 8 is a block diagram illustrating the entire control, and is configured by the following calculation units.

Figure 11:
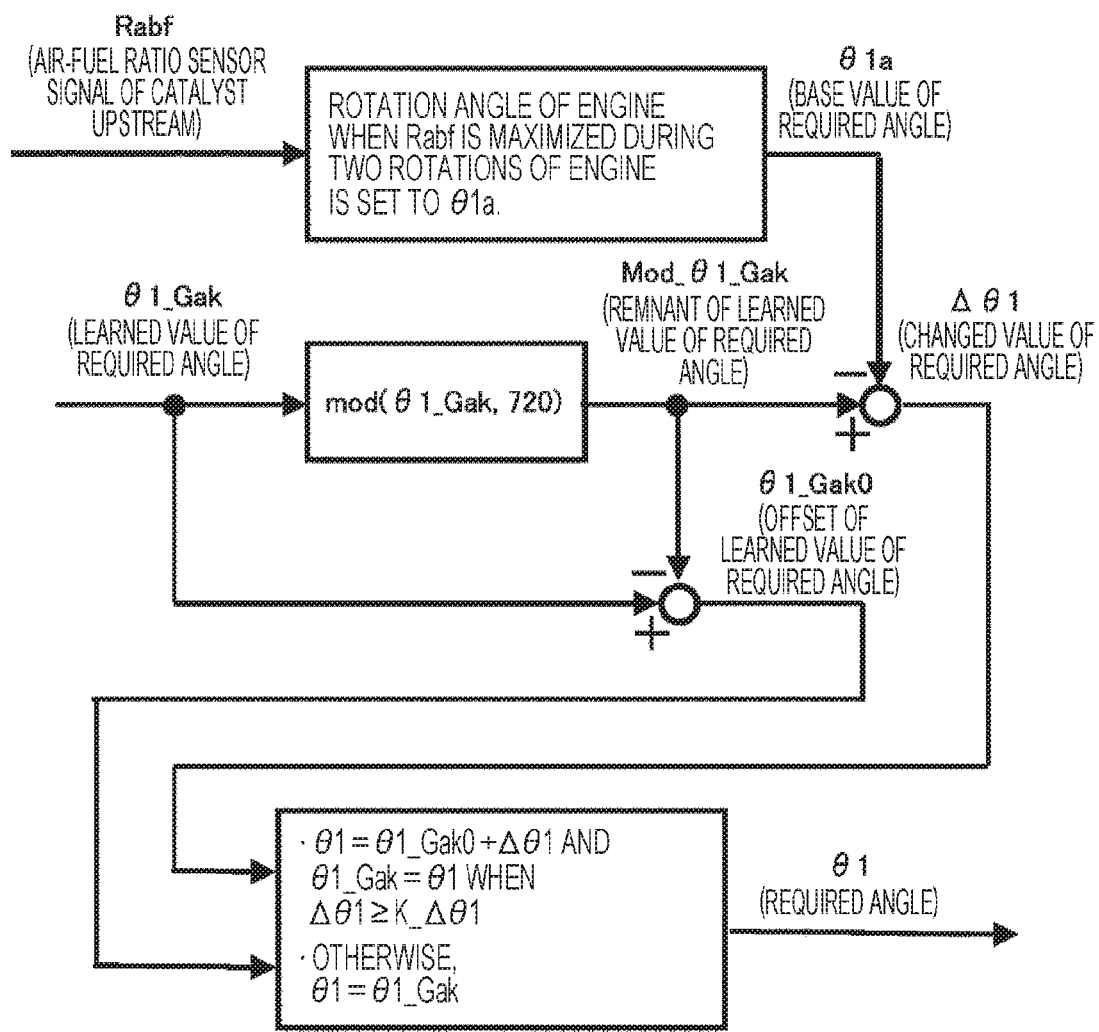
FIG. 11 is a block diagram illustrating a required angle calculation unit in the second embodiment.
Figure 12:
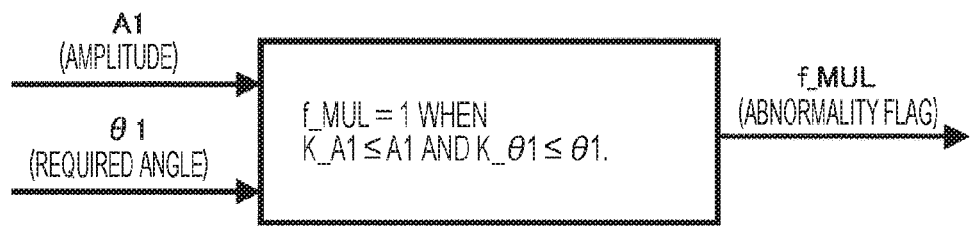
FIG. 12 is a block diagram illustrating the dead time abnormality determination unit in the second embodiment.

Fuel injection quantity correction value calculation unit (FIG. 9)
Amplitude calculation unit (FIG. 10)
Required angle calculation unit (FIG. 11)
Dead time abnormality determination unit (FIG. 12)

The "fuel injection quantity correction value calculation unit" calculates the fuel injection quantity correction values (Ti_hos1 to 4) of the respective cylinders. In particular, the air-fuel ratio oscillation in two rotation cycles of the engine is generated by shifting only the fuel injection quantity correction value (Ti_hos1) of one cylinder by a predetermined amount in this embodiment. The injection pulse widths (Ti1 to Ti4) to determine the fuel injection quantities of the respective cylinders are calculated by multiplying Ti_hos1 to 4 to the base fuel injection quantity (Tp). Further, while the method of calculating Tp is a well-known method, and thus the description thereof will not made in detail. The "amplitude calculation unit" obtains an amplitude (A1) of an air-fuel ratio signal from an air-fuel ratio sensor signal (Rabf) of the catalyst upstream. The "required angle calculation unit" obtains a required angle (θ1) from the air-fuel ratio sensor signal (Rabf) of the catalyst upstream until a time when Rabf is maximized during one cycle (two rotations of the engine). The "dead time abnormality determination unit" obtains the abnormality flag (f_MUL) from A1 and θ1. Hereinafter, the description will be made about the details of the respective calculation units.

<Fuel Injection Quantity Correction Value Calculation Unit (FIG. 9)>

Figure 9:
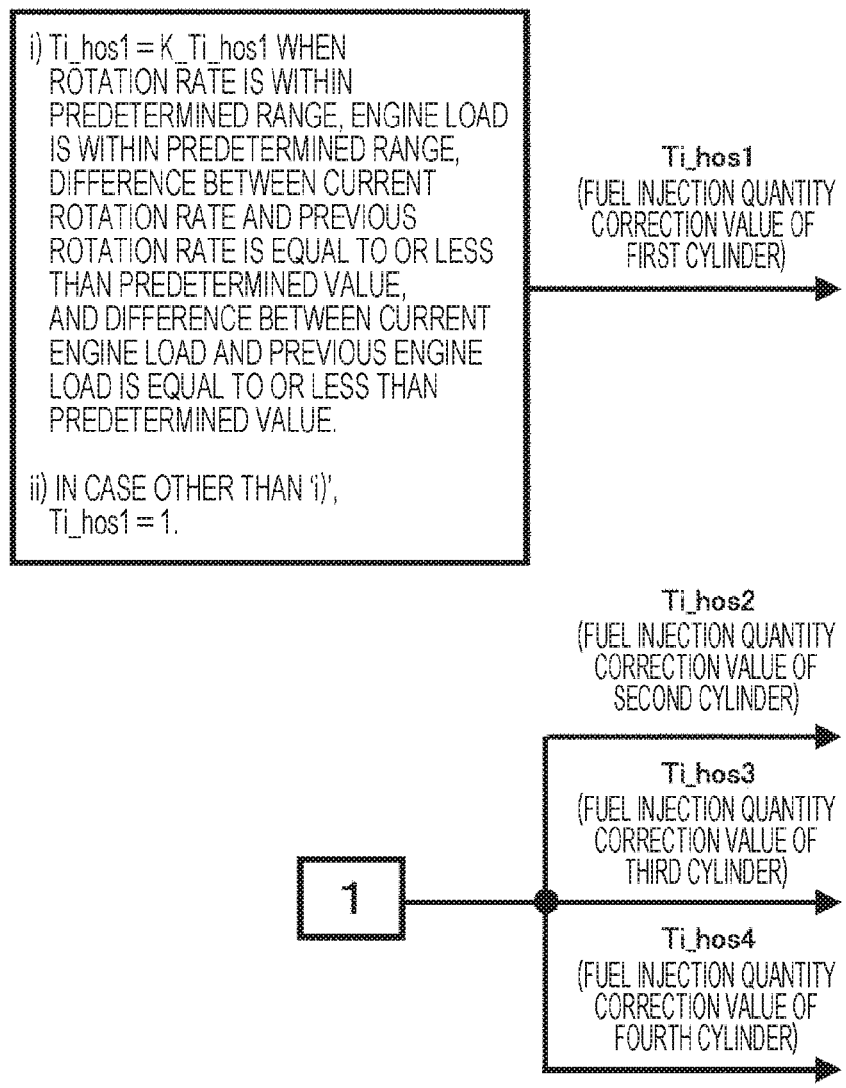
FIG. 9 is a block diagram illustrating the fuel injection quantity correction value calculation unit in the second to fourth embodiments.

In this calculation unit, Ti_hos1 to 4 (the fuel injection quantity correction value of the first to fourth cylinders) are calculated. Specifically, the calculation is illustrated in FIG. 9.

i) Ti_hos1 is set to K_Ti_hos1 when the rotation rate is within a predetermined range, the engine load is within a predetermined range, a difference between the current rotation rate and the previous rotation rate is equal to or less than a predetermined value, and a difference between the current engine load and the previous engine load is equal to or less than a predetermined value.

ii) In a case other than 'i)', Ti_hos1 is set to 1.

K_Ti_hos1 (the fuel injection quantity correction value of the first cylinder) is a value to determine the fuel injection quantity or the vibrational amplitude of the actual air-fuel ratio, and is determined in consideration of the running performance of the engine 9, the exhaust performance, and the detection accuracy of the dead time characteristics. Further, an influence onto the engine performance is taken into consideration. It is desirable that a cycle of Ti_hos1=K_Ti_hos1 be determined to a predetermined cycle and oscillated by a required minimum cycle.

<Amplitude Calculation Unit (FIG. 10)>

Figure 10:
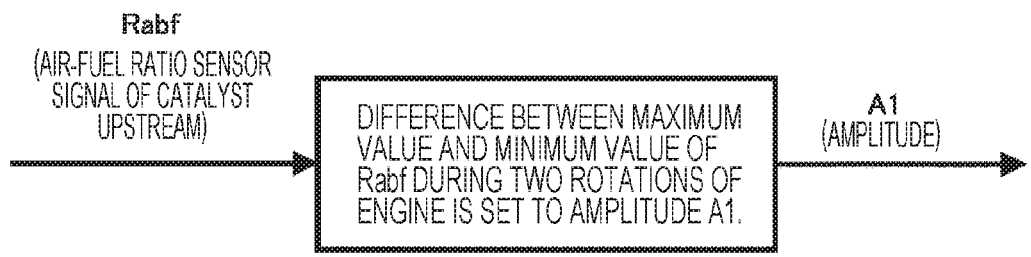
FIG. 10 is a block diagram illustrating the amplitude calculation unit in the second embodiment.

In this calculation unit, A1 (amplitude) is calculated. Specifically, the calculation is illustrated in FIG. 10. A difference between a maximum value and a minimum value of Rabf during a time when the engine 9 is rotated twice is set to the amplitude A1.

<Required Angle Calculation Unit (FIG. 11)>

In this calculation unit, θ1 (required angle) is calculated. Specifically, the calculation is illustrated in FIG. 6. The rotation angle of the engine when Rabf is a maximum value during a time when the engine 9 is rotated twice is set to θ1a (a base value of the required angle). A remnant obtained by dividing θ1_Gak (a learned value of the required angle) with 720 is set to Mod_θ1_Gak (a remnant of the learned value of the required angle). A difference between Mod_θ1_Gak and θ1a is set to Δθ1 (a changed value of the required angle).

A difference between θ1_Gak and Mod_θ1_Gak is set to θ1_Gak0 (an offset of the learned value of the required angle). When Δθ1≥K_Δθ1, θ1 is set to θ1_Gak0+Δθ1 and θ1_Gak is set to θ1.

In other cases, θ1 is set to θ1_Gak.

A length of the dead time of the air-fuel ratio sensor 12 may be larger than 720 deg corresponding to two rotations of the engine in angle conversion. On the other hand, 0≤θ1$a$<720 is satisfied. The above process is performed on an assumption that an angle of θ1_Gak (the learned value of the required angle) corresponding to the length of the dead time of the air-fuel ratio sensor 12 is larger than 720.

Further, an initial value of θ1_Gak is set to the length of the dead time in an initial state of the air-fuel ratio sensor. In addition, even when the dead time of the air-fuel ratio sensor 12 is constant, the required angle values used in this calculation unit are changed according to the rotation rate of the engine 9. Therefore, in a case where the detection is performed at various rotation rates, the correction is performed to make sensitivity of the rotation rate disappear.

<Dead Time Abnormality Determination Unit (FIG. 12)>

In this calculation unit, f_MUL (abnormality flag) is calculated. Specifically, the calculation is illustrated in FIG. 12.

When K_A1≤A1 and K_θ1≤θ1, f_MUL is set to 1.

K_A1 and K_θ1 are values to define a level for determining the dead time abnormality. These values are determined according to the diagnosis target performance.

In this embodiment, the air-fuel ratio change which oscillates at a frequency corresponding to two rotations of the engine is generated by shifting the fuel injection quantity of the first cylinder. However, the same phenomenon is obtained even by shifting the fuel injection quantity of any one of the second to fourth cylinders. In addition, the fuel injection quantities of a plurality of cylinders may be shifted at the same time. An optimal fuel injection quantity correction value of each cylinder may be determined in consideration of the exhaust performance, the running performance, and the like. In addition, the amplitude and the phase of the air-fuel ratio change in the two-rotation cycle of the engine are changed according to the fuel injection quantity correction value of each cylinder. Therefore, the initial value of θ1_Gak, K_A1, and K_θ1 are also set according to the change.

Third Embodiment

In this embodiment, the air-fuel ratio of one cylinder is set to be shifted by a predetermined amount from the air-fuel ratios of the others to generate oscillation in the air fuel oscillation in two rotation cycle of the engine. The air-fuel ratio sensor signal is Fourier-transformed, a power spectrum and a phase spectrum at the frequency corresponding to the two-rotation cycle of the engine are calculated. The dead time deterioration is detected using the power spectrum and the phase spectrum.

FIG. 1 is the diagram illustrating the system of this embodiment, and the same portions as those of the first embodiment will not be described in detail. FIG. 2 illustrates the inner configuration of the control unit 16, and the same portions as those of the first embodiment will not be described in detail.

Figure 13:
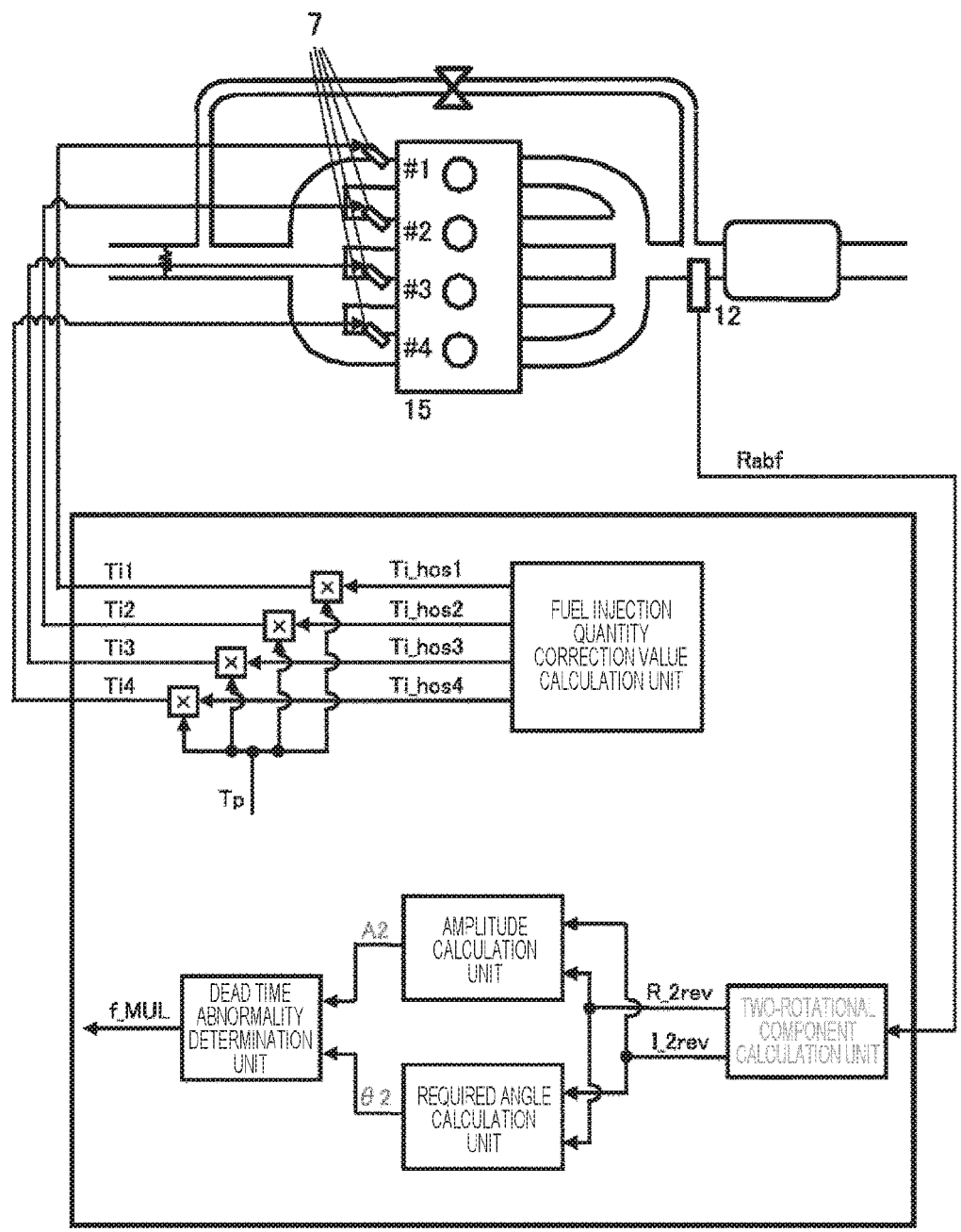
FIG. 13 is a block diagram illustrating the entire control in a third embodiment.

Hereinafter, the description will be made about the control program written in the ROM 22. FIG. 13 is a block diagram illustrating the entire control, and is configured by the following calculation units.

Figure 16:
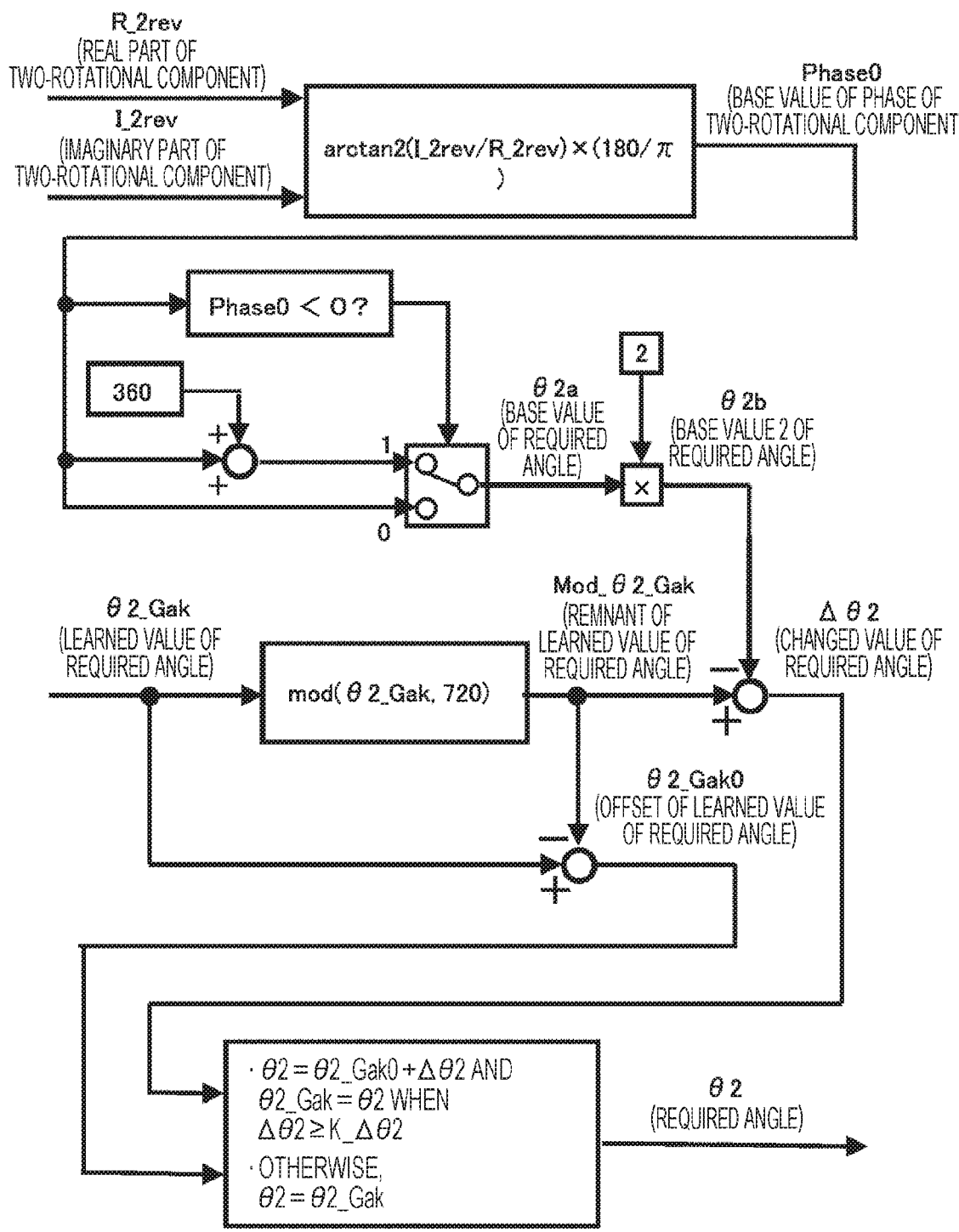
FIG. 16 is a block diagram illustrating the required angle calculation unit in the third and fourth embodiments.
Figure 17:
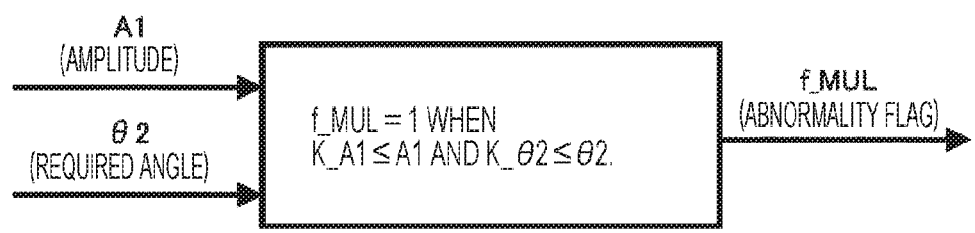
FIG. 17 is a block diagram illustrating the dead time abnormality determination unit in the third and fourth embodiments.

Fuel injection quantity correction value calculation unit (FIG. 9)
Two-rotational component calculation unit (FIG. 14)
Amplitude calculation unit (FIG. 15)
Required angle calculation unit (FIG. 16)
Dead time abnormality determination unit (FIG. 17)

The "fuel injection quantity correction value calculation unit" calculates the fuel injection quantity correction values (Ti_hos1 to 4) of the respective cylinders. In particular, the air-fuel ratio oscillation in two rotation cycles of the engine is generated by shifting only the fuel injection quantity correction value (Ti_hos1) of one cylinder by a predetermined amount in this embodiment. The injection pulse widths (Ti1 to Ti4) to determine the fuel injection quantities of the respective cylinders is calculated by multiplying Ti_hos1 to 4 to the base fuel injection quantity (Tp). Further, while the method of calculating Tp is a well-known method, and thus the description thereof will not made in detail. The "two-rotational component calculation unit" performs the Fourier transform on an air-fuel ratio sensor signal (Rabf) of the catalyst upstream, and calculates a real part (R_2rev) and an imaginary part (I_2rev) of the frequency component corresponding to the two-rotation cycle of the engine. The "amplitude calculation unit" obtains the power spectrum from R_2rev and I_2rev, and sets the amplitude (A1). The "required angle calculation unit" obtains the phase spectrum from R_2rev and I_2rev, and sets a required angle (θ2). The "dead time abnormality determination unit" obtains the abnormality flag (f_MUL) from A1 and θ2. Hereinafter, the description will be made about the details of the respective calculation units.

<Fuel Injection Quantity Correction Value Calculation Unit (FIG. 9)>

In this calculation unit, Ti_hos1 to 4 (the fuel injection quantity correction value of the first to fourth cylinders) are calculated. Specifically, while illustrated in FIG. 9, the calculation is the same as that of the second embodiment, and thus the description thereof will not be made in detail.

<Two-Rotational Component Calculation Unit (FIG. 14)>

Figure 14:
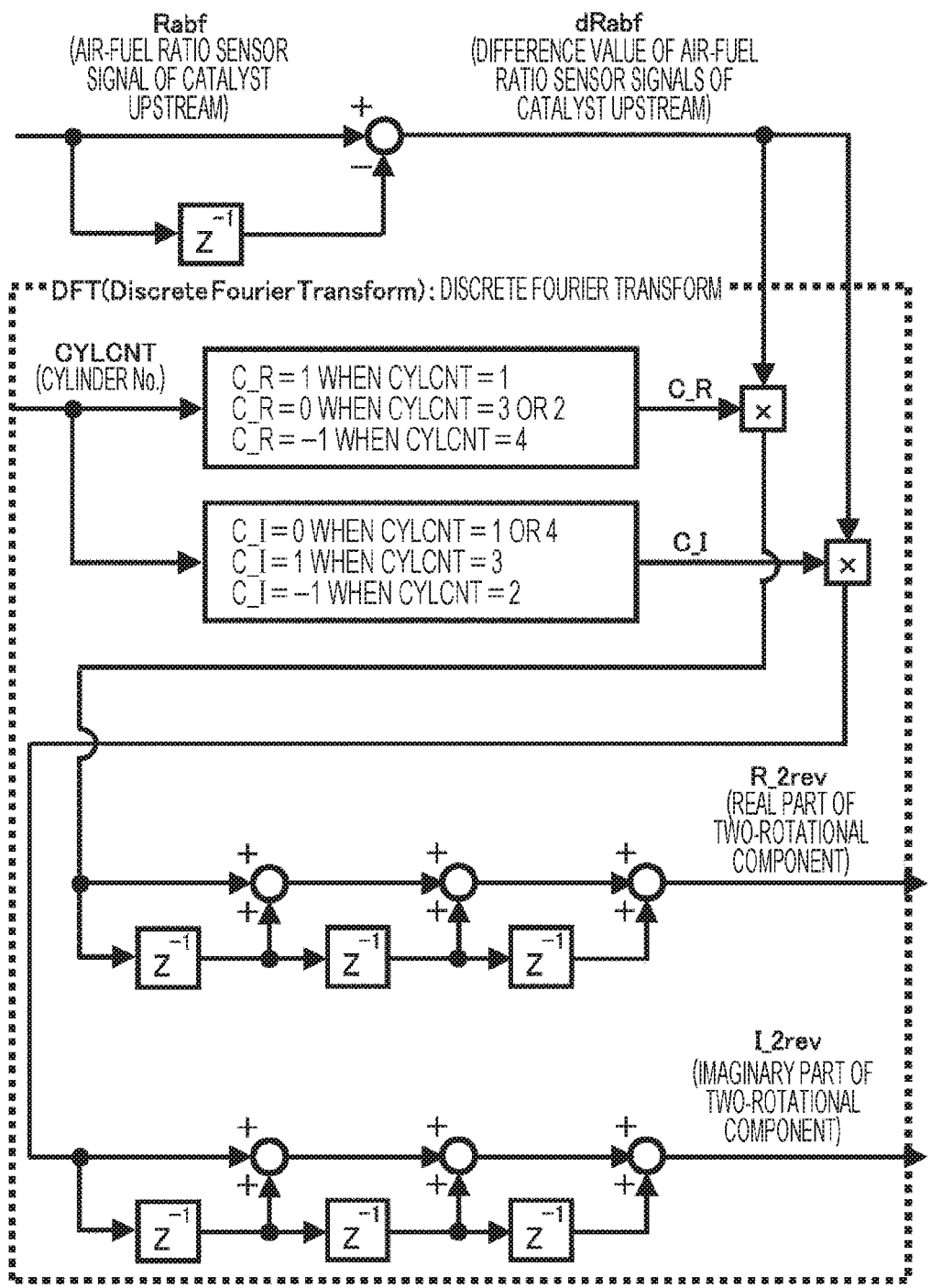
FIG. 14 is a block diagram illustrating a two-rotational component calculation unit in the third and fourth embodiments.

This calculation unit calculates the real part (R_2rev) and the imaginary part (I_2rev) of the two-rotational component of the signal (Rabf) of the air-fuel ratio sensor 12 of the catalyst upstream. Specifically, the calculation is illustrated in FIG. 14. A difference between the current value and the previous value of Rabf is calculated, and is set to dRabf (difference value of the air-fuel ratio sensor signals of the catalyst upstream). The process (discrete Fourier transform) surrounded by the broken line in the drawing is performed on dRabf.

The sum of the current value and the three previous values of C_R×dRabf are set to R_2rev. In addition, the sum of the current value and the three previous values of C_I×dRabf is set to I_2rev. Herein, C_R and C_I are calculated as follows according to CYLCNT (cylinder No.). CYLCNT is updated when a piston position of an N-th cylinder is at a predetermined value. Herein, it is assumed that the piston position is updated at 110 deg before a compression TDC of the subject cylinder.

When CYLCNT=1, C_R=1
When CYLCNT=3 or 2, C_R=0
When CYLCNT=4, C_R=−1

In addition,
When CYLCNT=1 or 4, C_I=0
When CYLCNT=3, C_I=1
When CYLCNT=2, C_I=−1

<Amplitude Calculation Unit (FIG. 15)>

Figure 15:
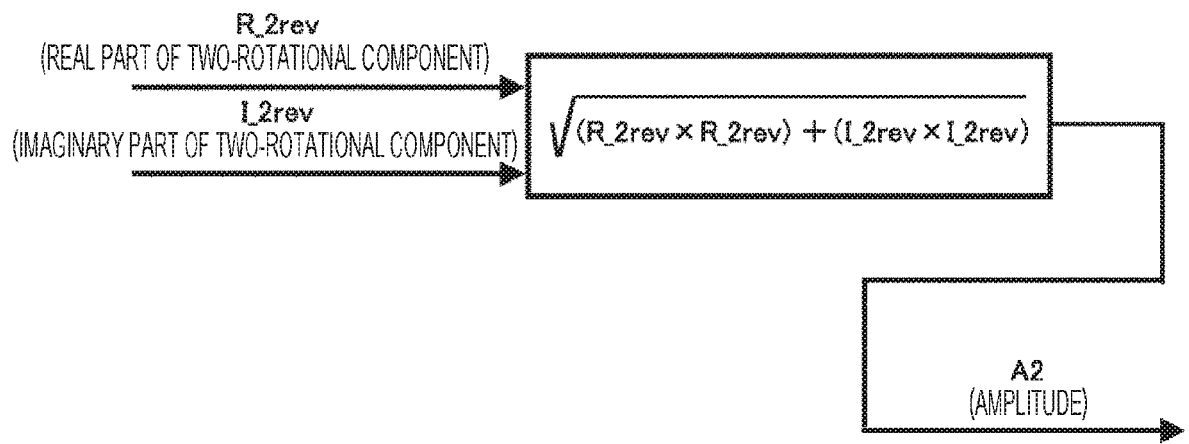
FIG. 15 is a block diagram illustrating the amplitude calculation unit in the third and fourth embodiments.

In this calculation unit, A2 (amplitude) is calculated. Specifically, the calculation is illustrated in FIG. 15. The power spectrum of the two-rotational component is obtained from R_2rev and I_2rev using the following formula, and is set to A2.

$$\sqrt{((R\_2rev \times R\_2rev)+(I\_2rev \times I\_2rev))}$$

In order to increase the accuracy, the power spectrum may be obtained in plural times to take an average value (or moving average).

<Required Angle Calculation Unit (FIG. 16)>

In this calculation unit, θ2 (required angle) is calculated. Specifically, the calculation is illustrated in FIG. 16. Phase0 (base value of phase of the two-rotational component) is obtained from R_2rev and I_2rev using the following formula.

$$\arctan 2(I\_2rev/R\_2rev) \times (180/\pi)$$

Herein, arctan 2 calculates an arc tangent value (=phase) corresponding to four quadrants (−180 to 180 deg). Furthermore, the phase spectrum having a phase range of 0 to 360 deg is set to θ2a (base value of the required angle). Specifically, when Phase0<0, θ2a=Phase0+360. In other cases, θ2a=Phase0.

θ2b is set to 2×θ2a.

Such settings are for converting θ2a to the rotation angle of the engine. A remnant obtained by dividing θ2_Gak (the learned value of the required angle) with 720 is set to Mod_θ2_Gak (a remnant of the learned value of the required angle). A difference between Mod_θ2_Gak and θ2a is set to Δθ2 (a changed value of the required angle). A difference between θ2_Gak and Mod_θ2_Gak is set to 2_Gak0 (an offset of the learned value of the required angle). When Δθ2≥K_Δθ2, θ2=θ2_Gak0+Δθ2, and θ2_Gak=θ2.

In other cases, θ2 is set to θ2_Gak.

A length of the dead time of the air-fuel ratio sensor 12 may be larger than 720 deg corresponding to two rotations of the engine in angle conversion. On the other hand, θ2b satisfies 0≤θ2b<720. The above process is performed on an assumption that θ2_Gak (the learned value of the required angle) which is an angle corresponding to the length of the dead time of the air-fuel ratio sensor 12 is larger than 720.

Further, an initial value of θ2_Gak becomes the length of the dead time in the initial state of the air-fuel ratio sensor. In addition, even when the dead time of the air-fuel ratio sensor 12 is constant, the required angle values used in this calculation unit are changed according to the rotation rate of the engine 9. Therefore, in a case where the detection is performed at various rotation rates, the correction is performed to make sensitivity of the rotation rate disappear. In addition, in order to increase the accuracy, an average value (or moving average) may be used for the calculation of θ2a.

<Dead Time Abnormality Determination Unit (FIG. 17)>

In this calculation unit, f_MUL (abnormality flag) is calculated. Specifically, the calculation is illustrated in FIG. 17.

When K_A1≤A1 and K_θ2≤θ2, f_MUL is set to 1. K_A1 and K_θ2 are values to define a level for determining the dead time abnormality. These values are determined according to the diagnosis target performance.

In this embodiment, the air-fuel ratio change which oscillates at a frequency corresponding to two rotations of the engine is generated by shifting the fuel injection quantity of the first cylinder. However, the same phenomenon is obtained even by shifting the fuel injection quantity of any one of the second to fourth cylinders. In addition, the fuel injection quantities of a plurality of cylinders may be shifted at the same time. An optimal fuel injection quantity correction value of each cylinder may be determined in consideration of the exhaust performance, the running performance, and the like. In addition, the amplitude and the phase of the air-fuel ratio change in the two-rotation cycle of the engine are changed according to the fuel injection quantity correction value of each cylinder. Therefore, the initial value of θ2_Gak, K_A1, and K_θ2 are also set according to the change.

Fourth Embodiment

In this embodiment, a parameter of air-fuel ratio feedback control is corrected on the basis of the detected dead time.

FIG. 1 is a diagram illustrating the system of this embodiment, and the same portions as those of the first embodiment will not be described in detail. FIG. 2 illustrates the inner configuration of the control unit 16, and the same portions as those of the first embodiment will not be described in detail.

Figure 18:
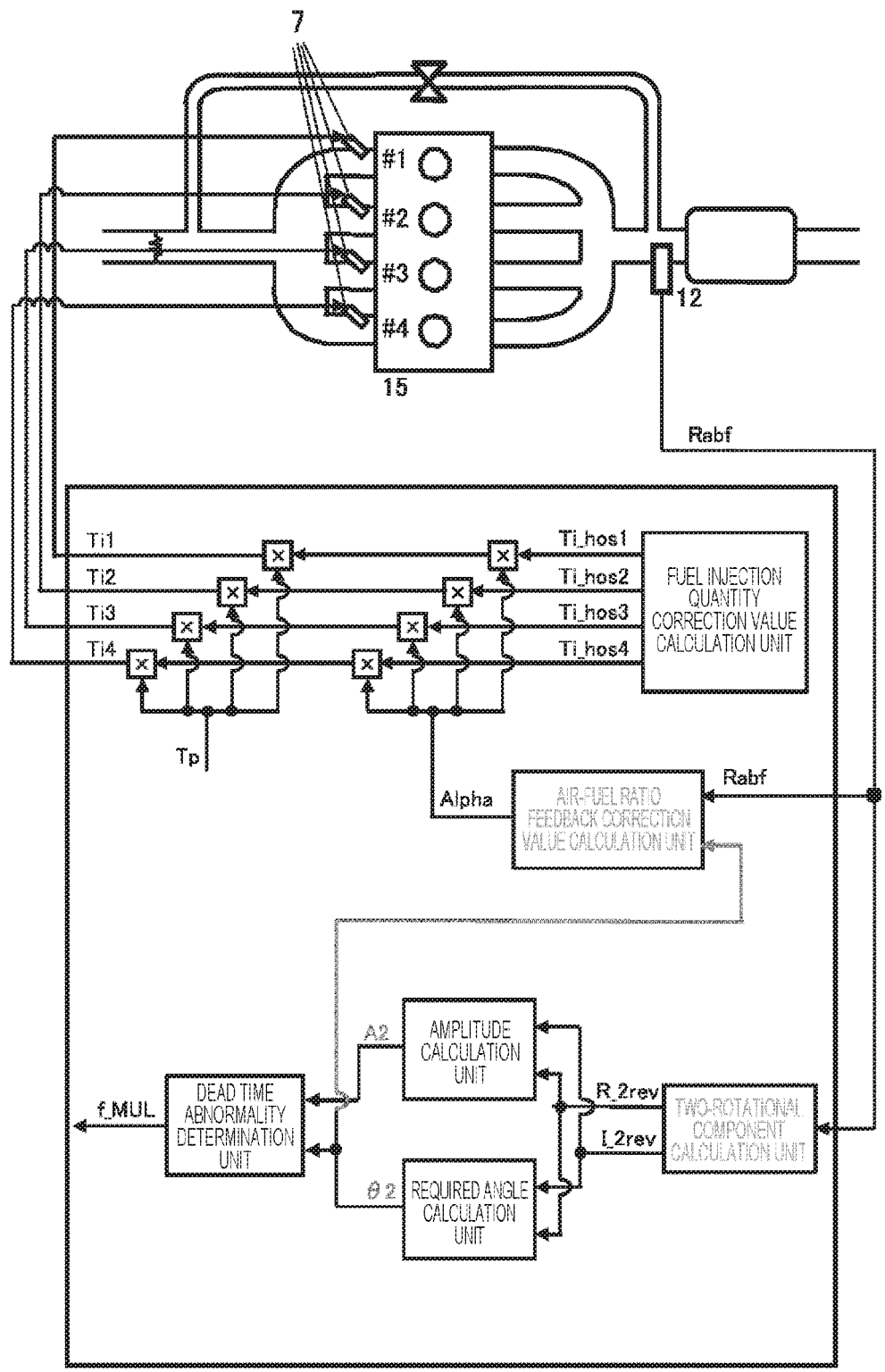
FIG. 18 is a block diagram illustrating the entire control in the fourth embodiment.

Hereinafter, the description will be made about the control program written in the ROM 22. FIG. 18 is a block diagram illustrating the entire control, and is configured by the following calculation units.

Figure 19:
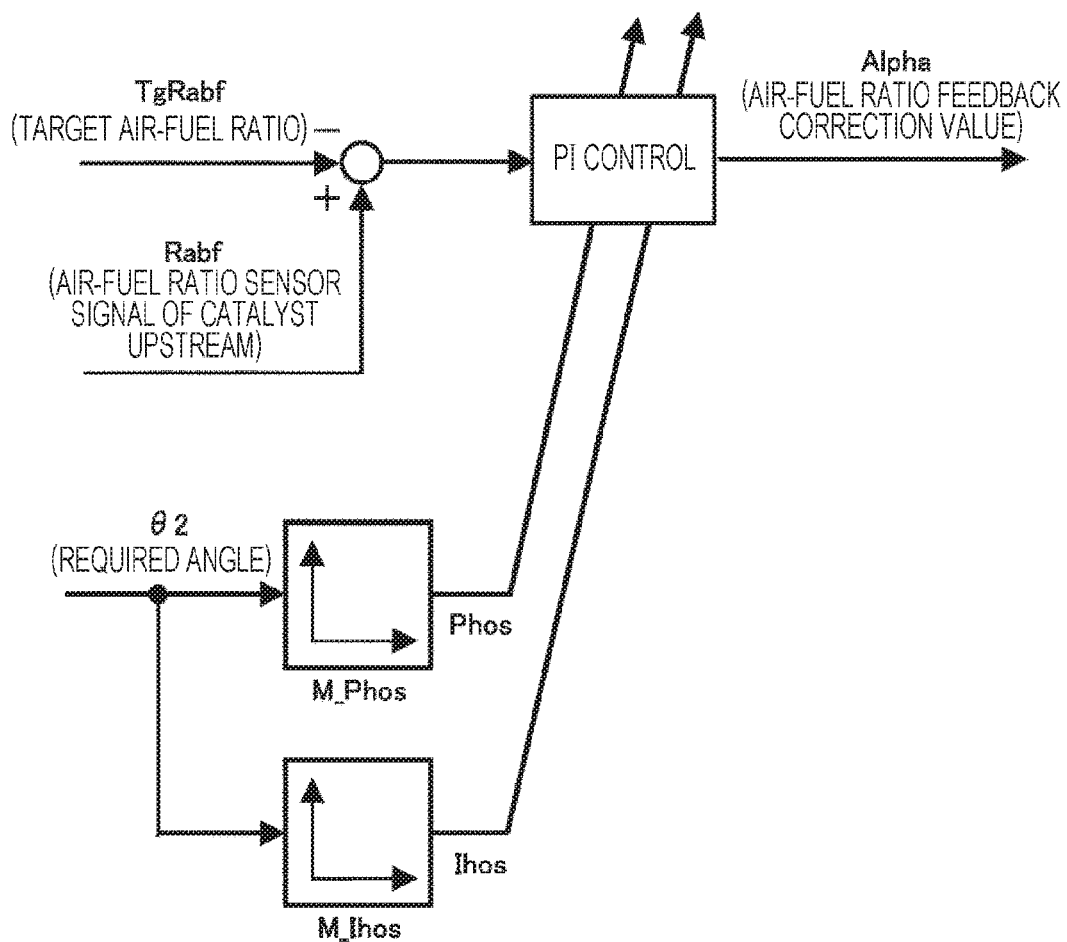
FIG. 19 is a block diagram illustrating an air-fuel ratio feedback correction value calculation unit in the fourth embodiment.

Fuel injection quantity correction value calculation unit (FIG. 9)
Two-rotational component calculation unit (FIG. 14)
Amplitude calculation unit (FIG. 15)
Required angle calculation unit (FIG. 16)
Dead time abnormality determination unit (FIG. 17)
Air-fuel ratio feedback correction value calculation unit (FIG. 19)

The "fuel injection quantity correction value calculation unit" calculates the fuel injection quantity correction values (Ti_hos1 to 4) of the respective cylinders. In particular, the air-fuel ratio oscillation in two rotation cycles of the engine is generated by shifting only the fuel injection quantity correction value (Ti_hos1) of one cylinder by a predetermined amount in this embodiment. The injection pulse widths (Ti1 to Ti4) to determine the fuel injection quantities of the respective cylinders is calculated by multiplying Ti_hos1 to 4 to the base fuel injection quantity (Tp). Further, while the method of calculating Tp is a well-known method, and thus the description thereof will not made in detail. The "two-rotational component calculation unit" performs the Fourier transform on an air-fuel ratio sensor signal (Rabf) of the catalyst upstream, and calculates a real part (R_2rev) and an imaginary part (I_2rev) of the frequency component corresponding to the two-rotation cycle of the engine. The "amplitude calculation unit" obtains the power spectrum from R_2rev and I_2rev, and sets the amplitude (A1). The "required angle calculation unit" obtains the phase spectrum from R_2rev and I_2rev, and sets a required angle (θ2). The "dead time abnormality determination unit" obtains the abnormality flag (f_MUL) from A1 and θ2. The "air-fuel ratio feedback correction value calculation unit" calculates a correction value (Alpha) to correct the fuel injection quantity such that the output value of the air-fuel ratio sensor signal (Rabf) of the catalyst upstream becomes a target value. In addition, the parameter related to the air-fuel ratio feedback is corrected according to the value of θ2. Hereinafter, the description will be made about the details of the respective calculation units.

<Fuel Injection Quantity Correction Value Calculation Unit (FIG. 9)>

In this calculation unit, Ti_hos1 to 4 (the fuel injection quantity correction value of the first to fourth cylinders) are calculated. Specifically, while illustrated in FIG. 9, the calculation is the same as that of the second embodiment, and thus the description thereof will not be made in detail.

<Two-rotational Component Calculation Unit (FIG. 14)>

This calculation unit calculates the real part (R_2rev) and the imaginary part (I_2rev) of the two-rotational component of the signal (Rabf) of the air-fuel ratio sensor 12 of the catalyst upstream. Specifically, while illustrated in FIG. 14, the calculation is the same as that of the third embodiment, and thus the description thereof will not be made in detail.

<Amplitude Calculation Unit (FIG. 15)>

In this calculation unit, A2 (amplitude) is calculated. Specifically, while illustrated in FIG. 15, the calculation is the same as that of the third embodiment, and thus the description thereof will not be made in detail.

<Required Angle Calculation Unit (FIG. 16)>

In this calculation unit, θ2 (required angle) is calculated. Specifically, while illustrated in FIG. 16, the calculation is the same as that of the third embodiment, and thus the description thereof will not be made in detail.

<Dead Time Abnormality Determination Unit (FIG. 17)>

In this calculation unit, f_MUL (abnormality flag) is calculated. Specifically, while illustrated in FIG. 17, the calculation is the same as that of the third embodiment, and thus the description thereof will not be made in detail.

<Air-fuel Ratio Feedback Correction Value Calculation Unit (FIG. 19)>

In this calculation unit, Alpha (the correction value of the air-fuel ratio feedback) is calculated. Specifically, the calculation is illustrated in FIG. 19. Alpha is calculated by a PI control on the basis of a difference between Rabf (the air-fuel ratio of the catalyst upstream) and TaRabf (the target air-fuel ratio).

A P gain (P_hos) of the PI control is obtained with reference to a table M_Phos from θ2.

An I gain (I_hos) of the PI control is obtained with reference to a table M_Ihos from θ2. M_Phos,M_Ihos is obtained from a transmission characteristic of an air-fuel ratio control system. In addition, the specification may be changed according to an operation condition of the engine 9. As a control method for the dead time system, there is a method of using a dead time system model such as a Smith method. While not illustrated in FIG. 19, the parameter of the dead time of the dead time model may be corrected using θ2.

Further, there is a method of controlling the air-fuel ratio of each cylinder to be a target air-fuel ratio while detecting or estimating the air-fuel ratio of each cylinder. When the above control is not being performed, the second to fourth embodiments are desirably performed. However, even when the control is being performed, it can be diagnosed during a cycle when the correction is performed by the control when the fuel injection quantity of a specific cylinder is shifted.

The features of the invention are collected in the following. A control device according to an aspect of the invention includes a unit which detects an air-fuel ratio, a unit which changes the air-fuel ratio in a predetermined cycle, and a unit which sends a notification of an abnormality in the air-fuel ratio detection unit or causes at least a portion of engine control to run in a fail-safe mode when an amplitude of an output signal of an air-fuel ratio detection unit at a predetermined frequency is equal to or more than a predetermined value and a required time or a required angle to arrive at a predetermined value of an output signal of the air-fuel ratio detection unit from a reference position or a reference time point of an engine-related parameter is equal to or more than a predetermined value.

In other words, in a deterioration mode of the air-fuel ratio sensor, there are mainly three deteriorations such as a gain deterioration, a responsiveness deterioration, and a dead time deterioration. When the air-fuel ratio is oscillated at the predetermined frequency, the amplitude of the air-fuel ratio at the time of the gain deterioration becomes small or large compared to that at a time when an oscillated air-fuel ratio is normal. The amplitude of the oscillated air-fuel ratio at the predetermined frequency or higher at the time of the responsiveness deterioration becomes small compared to that at a normal time. In addition, the phase of the oscillated air-fuel ratio (a position of a maximum value or a minimum value of the oscillated air-fuel ratio) is delayed compared to that at a normal time. At the time of the dead time deterioration, the amplitude of the oscillated air-fuel ratio is not changed compared to that at a normal time. In addition, the phase of the oscillated air-fuel ratio is delayed compared to that at a normal time. The phase is changed compared to that at a normal time when the responsiveness deterioration and the dead time deterioration occur. The amplitude becomes small at the time of the responsiveness deterioration, but is not changed at the time of the dead time deterioration. Therefore, as described above, when "an amplitude of an output signal of an air-fuel ratio sensor is equal to or more than a predetermined value" (the amplitude of the oscillated air-fuel ratio is not changed compared to that at a normal time) and "a required time or a required angle to arrive at a predetermined value of an output signal of the air-fuel ratio sensor from a reference position or a reference time point of an engine-related parameter is equal to or more than a predetermined value" (the phase of the oscillated air-fuel ratio is delayed compared to that at a normal time), the dead time characteristics of the air-fuel ratio sensor is deteriorated (the dead time becomes long), and the abnormality of the air-fuel ratio sensor is notified or a portion of the engine control is ran in the fail-safe mode.

In addition, the control device of the invention includes a unit which oscillates the air-fuel ratio at a frequency equal to or more than a predetermined frequency.

In other words, a lot of detection results are obtained in a short cycle by oscillating the air-fuel ratio at a predetermined frequency or higher, so that it is advantageous in practical usage. In addition, as described above, when the frequency is lower than the predetermined frequency at the time of the responsiveness deterioration, the amplitude does not become small compared to that at a normal time. Therefore, the frequency is set to be equal to or more than the predetermined frequency even in order to perform the detection separated from the dead time deterioration.

In addition, according to the control device for the engine of the invention, the predetermined frequency is a frequency equal to or more than a cutoff frequency in the frequency characteristics of the air-fuel ratio sensor.

In other words, it has been specifically described that at the time of the responsiveness deterioration, the frequency bandwidth where the amplitude is small is higher than the cutoff frequency compared to that at a normal time.

In addition, the control device of the invention includes a unit which oscillates the air-fuel ratio (the output signal of the detection unit) at the two-rotation cycle of the engine by shifting the air-fuel ratio of at least one cylinder by the predetermined amount from the air-fuel ratios of the others.

In other words, when the air-fuel ratio of at least one cylinder is shifted by the predetermined amount from the air-fuel ratios of the others, a deviation occurs in the air-fuel ratio between the cylinders. The air-fuel ratio signal of the exhaust pipe collecting part is oscillated in a cycle that the engine is rotated twice. The dead time deterioration of the air-fuel ratio sensor is detected from the oscillated air-fuel ratio by the above method. In this case, the average air-fuel ratios of all the cylinders become a target air-fuel ratio, so that the deterioration of the exhaust performance and the deterioration of the running performance are almost eliminated, and the dead time characteristics of the air-fuel ratio sensor can be detected.

In addition, according to the control device of the invention, the reference position or the reference time point of the engine-related parameter is a predetermined crank angle or a fuel injection quantity change time point of the engine.

In other words, it has been specifically described that the reference position for obtaining the phase of the oscillated air-fuel ratio (a position of a maximum value or a minimum value of the oscillated air-fuel ratio) is a predetermined angle of the engine. In other words, the frequency of the oscillation of the air-fuel ratio caused by the deviation of the air-fuel ratio between the cylinders described above corresponds to the two-rotation cycle of the engine. Therefore, for example, the required angle to arrive a maximum value or a minimum value of the oscillation waveform can be obtained as the phase with reference to the predetermined angle of the engine (for example, TDC or BDC of a specific cylinder). In addition, it has been specifically described that the reference time point for obtaining the phase of the oscillated air-fuel ratio is the fuel injection quantity change timing. In a case where the oscillated air-fuel ratio occurs by increasing or decreasing the fuel injection quantity of all the cylinders at the predetermined frequency, the required angle to arrive a maximum value or a minimum value of the oscillation waveform can be obtained as the phase with reference to the timing when the fuel injection quantity is changed.

In addition, according to the control device of the invention, the predetermined value of the output signal of the air-fuel ratio detection unit is a maximum value or a minimum value per a cycle of the oscillation waveform of the output signal of the air-fuel ratio detection unit.

In other words, in a case where the phase of the oscillation waveform of the air-fuel ratio is obtained, the angle and the time to arrive the determined position of the oscillation waveform of the air-fuel ratio may be obtained from the determined reference point such as the predetermined angle or the fuel injection quantity change time point of the engine as described above. It has been specifically described that the determined position of the oscillation waveform of the air-fuel ratio is a maximum value or a minimum value per a cycle of the oscillation waveform which is easily used.

In addition, the control device of the invention includes a unit which performs a Fourier transform on the output signal of the air-fuel ratio detection unit, a unit which obtains the amplitude from the power spectrum obtained through the Fourier transform, and a unit which obtains the required time or the required angle to arrive the predetermined value of the output signal of the air-fuel ratio detection unit from the phase spectrum obtained through the Fourier transform and from the reference position or the reference time point of the engine-related parameter.

In other words, the power spectrum and the phase spectrum are obtained by performing the Fourier transform on the signal of the oscillated air-fuel ratio. The "amplitude of the power spectrum at the oscillation frequency of the oscillated air-fuel ratio" and the "amplitude of the oscillated air-fuel ratio" are proportional to each other. In addition, "the phase spectrum value at the oscillation frequency of the oscillated air-fuel ratio" is correlated with "the required time or the required angle to arrive the predetermined value (for example, a maximum value or a minimum value) of the oscillated air-fuel ratio from the reference position or the reference time point of the engine-related parameter". This relation is used.

In addition, the control device of the invention includes a unit which changes a parameter of the air-fuel ratio feedback control on the basis of the required time or the required angle to arrive the predetermined value of the output signal of the air-fuel ratio detection unit from the reference position or the reference time point of the engine-related parameter.

In other words, a parameter related to the performance of the air-fuel ratio feedback control is predetermined in a case where the air-fuel ratio sensor is normal or on an assumption that the characteristics thereof is deteriorated within a certain range. When the dead time characteristics of the air-fuel ratio sensor is largely changed, there occurs mismatching with respect to the parameter, and thus the performance of the air-fuel ratio feedback control is deteriorated. Therefore, in the above method, the parameter of the air-fuel ratio feedback control is optimized on the basis of the required time or the required angle to arrive the predetermined value (for example, a maximum value or a minimum value) of the oscillated air-fuel ratio from the reference position or the reference time point of the engine-related parameter corresponding to the dead time, so that the deterioration of the performance is suppressed.

REFERENCE SIGNS LIST 1 air cleaner
2 air flow sensor air flow sensor
3 electronic throttle
4 intake pipe
5 collector
6 accelerator
7 fuel injection valve
8 ignition plug
9 engine
10 exhaust pipe
11 three-way catalyst
12 air-fuel ratio sensor
13 accelerator opening sensor
14 water temperature sensor
15 crank angle sensor
16 control unit
17 throttle opening sensor
18 exhaust recirculating pipe
19 EGR valve
20 catalyst downstream O2 sensor
21 CPU
22 ROM
23 RAM
24 input circuit
25 input/output port
26 ignition output circuit
27 fuel injection valve drive circuit
28 electronic throttle drive circuit
29 intake air temperature sensor
30 EGR valve drive circuit

The invention claimed is:
1. A control device for an engine, wherein the engine includes a fuel injector and an air-fuel ratio sensor that detects an air-fuel ratio of exhaust in an engine exhaust pipe, the control device comprising:

a drive circuit that outputs a drive signal to the fuel injector; and an input circuit that inputs an output signal of the air-fuel ratio sensor, wherein the control device is configured to provide notification of an abnormality in the air-fuel ratio sensor or cause at least a portion of engine control to run in a fail-safe mode, and change the air-fuel ratio of the exhaust in the engine exhaust pipe, when an amplitude of the output signal of the air-fuel ratio sensor at a predetermined frequency while the air fuel ratio is changed is equal to or more than a predetermined amplitude value, and a required time or a required angle to arrive at a predetermined value of the output signal from a reference time point or a reference position of a parameter related to a phase of the engine is equal to or more than a predetermined time or angle value, and wherein the control device is further configured to oscillate the air-fuel ratio at a frequency equal to or more than a predetermined oscillation frequency, and oscillate the output signal of the air-fuel ratio sensor in a two-rotation cycle of the engine by shifting only a fuel injection quantity correction value of one cylinder by a predetermined amount from air-fuel ratios of the other cylinders.

2. The control device for the engine according to claim 1, wherein the predetermined frequency is a frequency equal to or more than a cutoff frequency in frequency characteristics of the air-fuel ratio sensor.

3. The control device for the engine according to claim 1, wherein the reference time point or the reference position of the parameter related to the phase of the engine is a predetermined crank angle or a fuel injection quantity change time point of the engine.

4. The control device for the engine according to claim 1, wherein the predetermined value of the output signal of the air-fuel ratio sensor is a maximum value or a minimum value per a cycle of an oscillation waveform of the output signal of the air-fuel ratio sensor.

5. The control device for the engine according to claim 1, and further comprising:

a Fourier transform unit that performs a Fourier transform on the output signal of the air-fuel ratio sensor;

an amplitude calculation unit that obtains the amplitude from a power spectrum obtained through the Fourier transform; and a required time or angle calculation unit that obtains the required time or the required angle to arrive at the predetermined value of the output signal of the air-fuel ratio sensor.

* * * * *